United States Patent
Perkins

[15] 3,653,115
[45] Apr. 4, 1972

[54] PIPE JOINING JACK

[72] Inventor: Ralph Perkins, 727 West Pyron Street, San Antonio, Tex. 78214

[22] Filed: Aug. 6, 1970

[21] Appl. No.: 61,555

[52] U.S. Cl. ................................29/237, 29/282, 254/29 R
[51] Int. Cl.........................................................B23p 19/02
[58] Field of Search ..........................254/29; 29/237, 280, 282

[56] References Cited

UNITED STATES PATENTS

2,691,211  10/1954  Leiber..............................254/29 R X
2,719,695  10/1955  McKee.............................254/29 R X

*Primary Examiner*—Andrew R. Juhasz
*Assistant Examiner*—Michael Koczo, Jr.
*Attorney*—Marion E. Shafer

[57] ABSTRACT

A compound joint jack for use in joining sewer pipes and other large underground pipes and adapted to operate in close quarters, having adjustable fittings and gripping jaws capable of gripping the smooth surface of various sizes of pipe without the use of chains or straps; such instrument enabling a single man to exert several hundred pounds of compression pressure with the use of a single lever and compound ratchet assembly in order to lock or unlock sections of pipes fitted with neoprene washers.

1 Claim, 24 Drawing Figures

RALPH PERKINS
INVENTOR.
BY M. E. Shafer
ATTORNEY

PIPE JOINING JACK

SUBJECT MATTER OF INVENTION

This invention relates to improvements in devices designed to mate and establish connection between successive sections of large segmented pipe or tubing such as cast iron sewer or soil pipe. In particular, it relates to a compound or double-action pipe joint jack.

BACKGROUND OF THE INVENTION

In laying down sewer pipe the common production procedure is to dig a narrow ditch of the proper depth with a rotary back-hoe or trench, and then lower into the ditch sections of pipe to the approximate number required. It is then necessary to connect sections of pipe together by dragging or shoving them along the bottom of the ditch. After the adjacent sections have been mated, they must be clamped tightly together while sealer is introduced into the joint and allowed to set. Both the dragging and the clamping together of sections have presented many problems which the present invention obviates.

For example, in a deep ditch or slit trench 1 foot wide and 2 to 6 feet deep, it is quite difficult to clamber down and shift heavy sections of pipe by means of human muscle alone.

Once sections of pipe have been mated, if it is desired to uncouple and move the sections apart for any reason, even greater difficulty is encountered. Other devices exist which move pieces of soil pipe together, but the present invention separates as easily as it couples them.

In order to clamp two sections of pipe tightly together, a firm grip must be taken by some means, and applied so evenly as to avoid cracking or breaking the cast metal or fired clay. Existing devices intended to clamp sections of pipe together so not satisfy both requirements; either tending to slip or tending to crush pipe. The present invention provides for the first time a method of exerting precisely the right amount of clasping force in a continuously adjustable manner.

In the former state of the art of laying and connecting buried pipe, it was necessary to pour molten lead into the flange in the joints to seal them. Today, washers of neoprene and related durable plastic materials are substituted for lead, with considerable improvement in the reliability and speed of joint sealing. However, the force required to couple sections of pipe fitted with neoprene washers exceeds any force previously required, and the force required to separate coupled sections fitted with neoprene washers exceeds several hundred pounds. The work must be performed in close quarters, often at the bottom of a narrow trench with room for only one worker and he must be able to both hold the two sections of pipe in alignment and exert the pressure required to couple the pipes together with the highly resistant neoprene washer in place. Joint jacks which formerly were used to mearly move the pipe into position and hold the two sections of pipe in alignment until lead or tar could be poured into the joint to seal it are, of course, inadequate to the demands for high pressure as well as accurate alignment when neoprene washers are used as a substitute for lead sealed joints. Efforts to adapt the older styles of joint jacks to meet the requirements of sealing pipe joints with neoprene washers have also proved inadequate.

OBJECTS OF THE INVENTION

An object of this invention is to provide a pipe joint jack that can be operated in a narrow trench by a single man by a lever that operates the jack parallel to the length of the trench to compress pressure required to join segments of pipe fitted with neoprene washers.

Another object of this invention is to provide a pipe joint jack that will disassemble sealed pipe segments by reversing the pawls on the inner and outer ratchet tubes and operating the lever in the same manner as used in locking the pipe segments.

Joint jacks have long been provided with yokes to engage the collar end of segments of pipe but the problem has been to devise a practical means of exerting pressure on the straight end of the next segment of pipe. It is, therefore, an object of this invention to provide a pipe joint jack that will adjust to various sizes of pipe by the use of a jaw that can be adjusted to the outer diameter of the straight pipe segment by the handle from the ratchet assembly area placed in the socket at the jaw and opened or closed, depending on the size of the pipe to be joined.

Another object of this invention is to provide a pipe joint jack that will hold the straight segment of pipe securely without the pipe slipping or crimping by constructing the jack jaw with an inner leaf that wedges against the pipe, forming a friction lock.

A further object of the invention is to provide a joint jack that can be reversed by simple adjustment to separate pipe joints without having to breakdown and reassemble the parts of the jack.

These and other objects and advantages of this invention will become apparent through consideration of the following description and appended claims in conjunction with the attached drawings in which:

In describing one selected form or preferred embodiment of this invention as shown in the drawings and described in this specification, specific terms and components are used for clarity. However, it is not intended to limit the claimed invention to the specific form, components or construction shown and it is to be understood that the specific terms used in this illustration of the invention are intended to include all technical equivalents which operate in a similar manner to accomplish a similar purpose.

DETAILED DESCRIPTION OF

PREFERRED EMBODIMENT OF INVENTION

Figure 1:
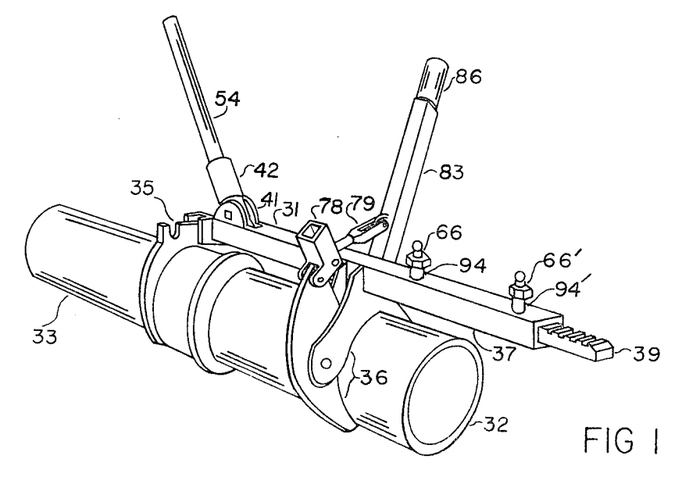
FIG. 1 is an oblique perspective view of the compound or double action pipe joint jack shown clamped to two successive sections of soil or sewer pipe in such manner as to bring together and couple the two sections of pipe.

Referring to the specific embodiment of the Invention selected for illustration in the accompanying drawings, the Number 31 in FIG. 1 generally designates a double action pipe joint jack for clamping upon and coupling together or uncoupling successive pieces of sewer line tubing or soil pipe 32 and 33 while said pieces of tubing or pipe are lying in place in a ditch or excavation.

Figure 2:
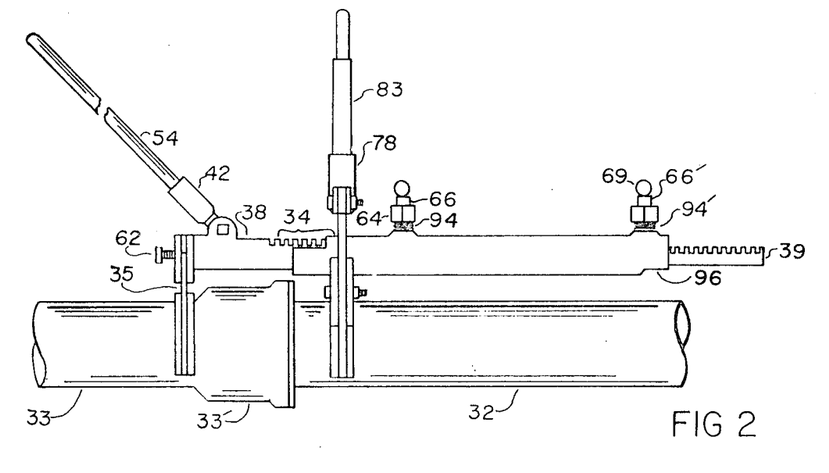
FIG. 2 is a side elevation view of this device of this invention taken from the same side as was shown in FIG. 1.

Said double action pipe joint jack 31 is comprised of 3 principal parts: a compound ratchet assembly 34, as illustrated in FIGS. 2, 7, and 22 through 24, to which is attached a fixed pipe grip 35 at one end of said ratchet assembly 34 and an adjustable pipe grip mechanism 36 attached at an intermediate position on said joint jack. Both fixed pipe grip 35 and adjustable pipe grip 36 are traversely oriented with relation to compound ratchet assembly 34 so as to partially encircle the circumference of sections of pipe or tubing while compound ratchet assembly is oriented parallel to the common axis of the pipe line, as shown in FIG. 2.

At the heart of the improved joint jack described herein is a lever operated compound ratchet assembly 34 which is composed of an exterior frame tube 37 within which is slidably and axially oriented intermediate ratchet tube 38 within which, in turn, is a slidably and axially oriented inner ratchet bar 39. These three parts are mutually co-axial as illustrated in FIGS. 2, 7 and 22 through 24 to produce a double acting compound jack mechanism of exceptional strength and compactness in which alternate ratchet devices operate to produce expansive or compressive force with each stroke of the operating lever.

Figures 3, 4, 5, 6:
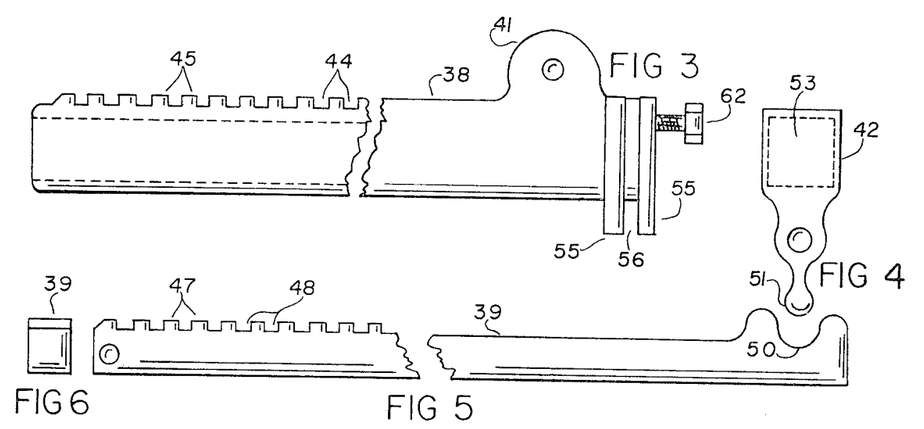
FIG. 3 is a side elevation view of the intermediate ratchet tube portion of the compound ratchet assembly of the present invention, showing the relationship of the various parts thereof.
FIG. 4 is a side elevation view of the operating lever part of the compound ratchet assembly of the invention.
FIG. 5 is a side elevation view of the inner ratchet bar, placed in relation to FIG. 4 in such a manner as to show how these two parts of the compound ratchet assembly connect to one another.
FIG. 6 is an end elevation view of the inner ratchet in cross section.
Figures 7, 8, 9, 10:
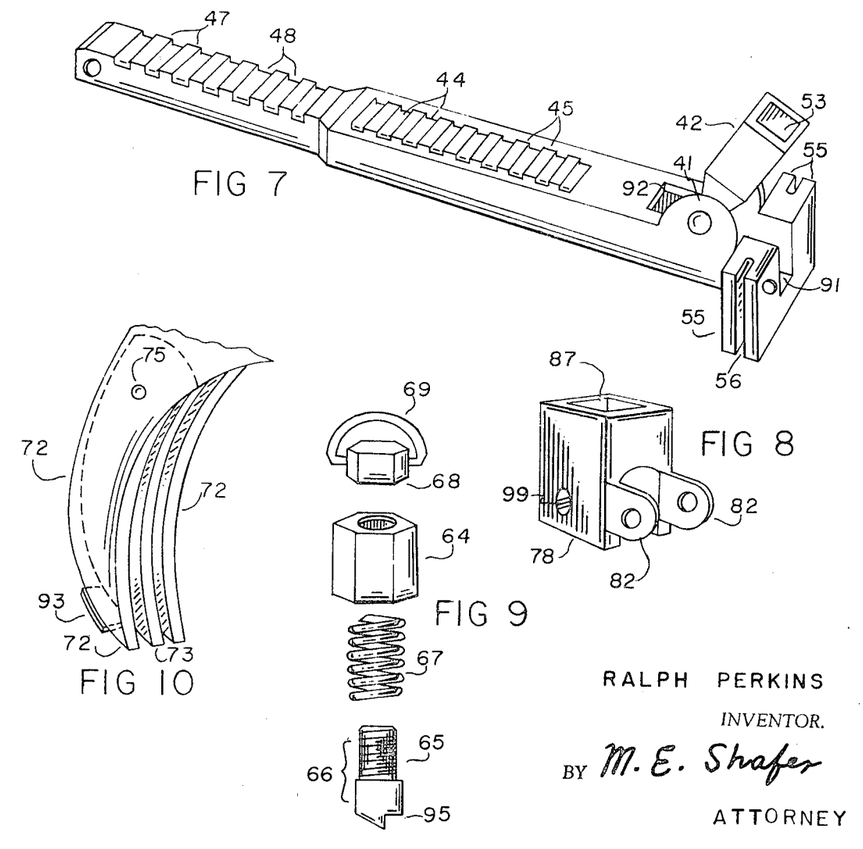
FIG. 7 is an oblique perspective view of the three parts of the compound ratchet assembly previously shown in FIGS. 3, 4, and 5, showing the manner in which they fit together in operation.
FIG. 8 is an oblique view of the crank lock portion of the clamp mechanism of the adjustable pipe grip part of the invention, showing its turnbuckle mounting ears, pin flanges and recess for inserting an extension handle.
FIG. 9 is an exploded view of one of the reversible rack pawls.
FIG. 10 is an oblique view of the fixed jaw and friction leaf of the adjustable pipe grip part of this invention, showing the method of assembly employed.
Figures 11, 12, 13, 14, 15, 16, 17, 18:
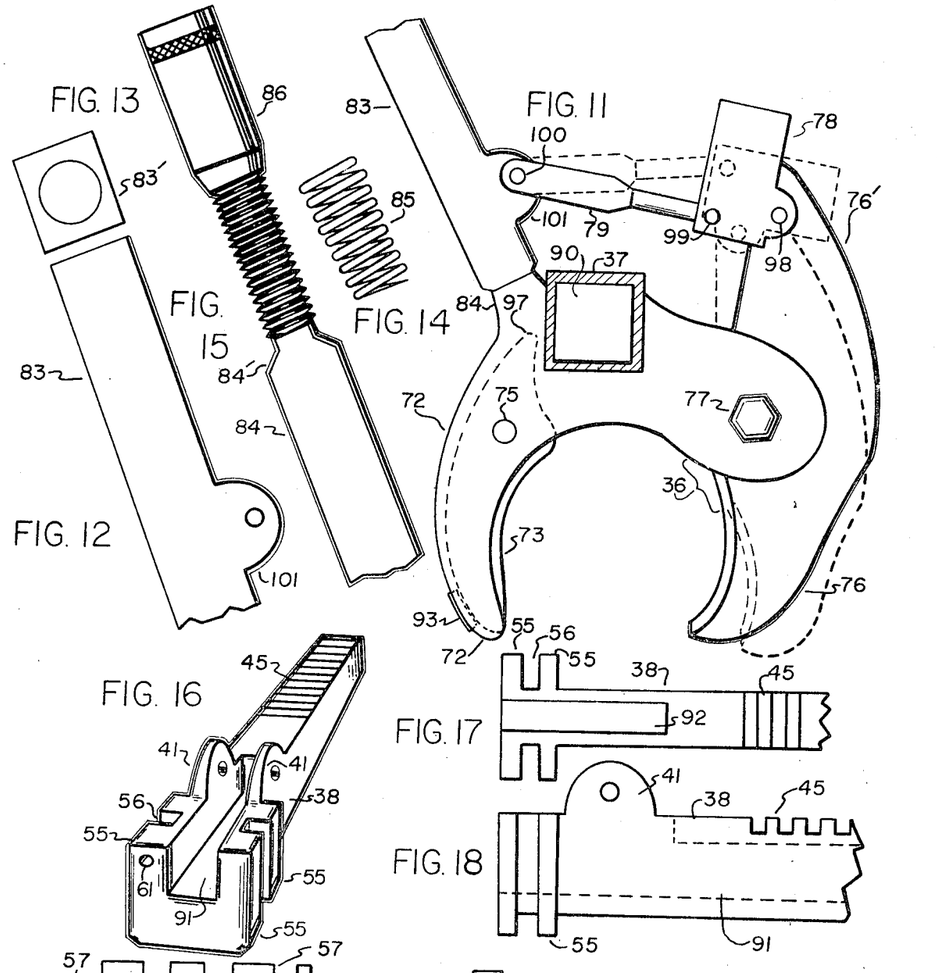
FIG. 11 is an end elevation view of the entire adjustable pipe grip part of the invention, in which dashed lines are used to represent hidden portions of the friction leaf and to represent alternative positions of the hinged jaw and clamp mechanism when the adjustable pipe grip is opened to fit around a piece of pipe.
FIG. 12 is a partial side elevation view of the tubular sleeve portion of the clamp mechanism shown in FIG. 11.
FIG. 13 is an elevation view of the knurled collar portion of the clamp mechanism shown in FIG. 11.
FIG. 14 is an elevation view of the compression spring.
FIG. 15 is a partial elevation view of the threaded arm portion of the clamp mechanism shown in FIG. 11.
FIG. 16 is an end perspective view of the intermediate ratched tube part of the compound ratchet assembly shown in FIG. 7.
FIG. 17 is a partial plan view of the intermediate ratchet tube shown in FIG. 3 and FIG. 16.
FIG. 18 is a partial view of said intermediate ratchet tube.

Exterior frame tube 37 is generally rectangularly shaped with provision for mounting two ratchet pawls in one of its surfaces and provided with a rectangular longitudinal opening 90 through the length of said tube of sufficient size to permit intermediate ratchet tube 38 to slide within said exterior frame tube 37. Said intermediate ratchet tube 38 is also a rectangular tube fabricated from tool steel or other appropriate strong metal and provided with a longitudinal rectangular opening 91 of sufficient size or clearance to permit inner ratchet bar 39 to slide within said intermediate ratchet tube. Referring again to FIGS. 16, 17, and 18 to illustrate the detailed construction of intermediate ratchet tube 38, said ratchet tube is provided with ratchet teeth 45 cut into one of the faces of the tube transversely to the length of the tube. Said teeth 45 may be formed by transverse notching across one entire width of one surface of the tube as shown in FIGS. 3, 17 and 18 or the teeth may be formed by cutting grooves into the center portion of one face of said intermediate ratchet tube as illustrated in FIG. 7. There is less danger of the edges of intermediate ratchet tube 38 hanging or jamming on the corners of exterior frame tube 37 if the teeth are cut into the face of the tube without extending to the outside edge of the tube as shown in the version of said tube illustrated in FIG. 7.

Intermediate ratchet tube 38 is provided with a slot shaped opening 92 through one surface of said tube at the opposite end of the tube from that provided with ratchet teeth. On each side of said slot shaped opening 92 in one end of the upper surface of intermediate ratchet tube 38 are spaced apart ears 41—41 between which is pivotally mounted an operating lever 42 which extends through opening 92 into the interior of said intermediate ratchet tube 38 to engage a cam bearing surface 50 on inner ratchet bar 39, which, of course, slides back and forth inside of said intermediate ratchet tube.

At the opposite end of intermediate ratchet tube 38 from the end provided with ratchet teeth are a pair of spaced apart mounting flanges 55—55 which extend around three sides of the opening 91 at the end of said ratchet tube which mounting flanges are adapted to receive and hold an attachable removable fixed pipe grip collar in a transverse position with respect to the longitudinal axis of said intermediate ratchet tube. Said mounting flanges 55-55 are illustrated in FIGS. 7, 16, 17, and 18 and a means for locking the fixed pipe grip structure 35 into position between said flanges is provided on the surface of one of said flanges. In the experimental prototype of this invention the locking means was a set screw 62 which projected through threaded hole 61 in outer mounting flange 55 to provide a friction lock against said fixed pipe grip 35 when the same is secured in position between said mounting flanges.

Inner ratchet bar 39, as illustrated in FIG. 5, is adapted to fit within and slide back and forth inside the longitudinal opening within intermediate ratchet tube 38. The forward end of said inner ratchet bar 39 is provided with a generally U-shaped cam surface 50 which is positioned within the forward portion of intermediate ratchet tube 38 in such manner that said cam surface 50 is positioned within slot shaped opening 92 such that one end of operating ratchet lever 42 when pivotally mounted between spaced apart ears 41–41 will be so engaged by said operating lever 42 that inner ratchet bar 39 will be caused to move backward and forward with each alternate stroke or reversal of position of said pivotally mounted operating ratchet lever 42. The bearing end of operating lever 42 which engages said cam surface 50 on inner ratchet bar 39 is provided with a mating cam surface which will be referred to herein as an oscillating pin 51 although it should be appreciated that said bearing cam surface on oscillating pin 51 could be fabricated in a variety of shapes and still perform the function of moving ratchet bar 39 backward and forward with each alternating stroke of jack operating lever 42. The upper end of said operating lever 42 is provided with an appropriate recess 53 adapted receive an attachable removable extention handle 54.

At the opposite end of said ratchet bar 39 from the end provided with said cam surface 50 are a series of alternating ratchet teeth 47 and grooves 48 cut transversely across the upper surface of said inner ratchet bar 39. Said ratchet teeth 47 extend along approximately one half the length of said ratchet bar 39 and ratchet bar 39 is of such length that at least 2 to 3 inches of the teethed end of said ratchet bar 39 extend out of and beyond the rear end of intermediate ratchet tube 38 (as illustrated in FIG. 7) when the ratchet bar is in such position as to place cam surface 50 in engagement with operating lever 42 which is, of course, pivotally mounted between ears 41—41 on the forward end of the intermediate ratchet tube 38.

Figure 21:
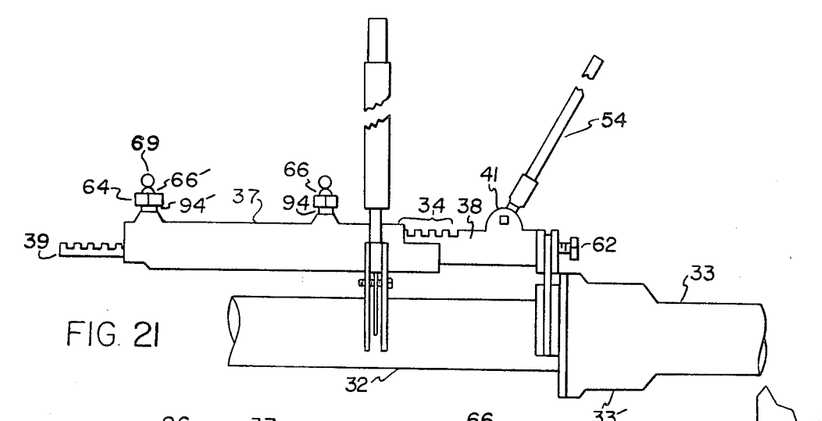
FIG. 21 is a side elevation view of the invention as a whole taken from the opposite side than that shown in FIG. 1 and showing said joint jack clamped to one piece of pipe and positioned to push against the bell of an adjacent segment of pipe in such manner as to separate and uncouple the two sections of pipe.
Figure 22:
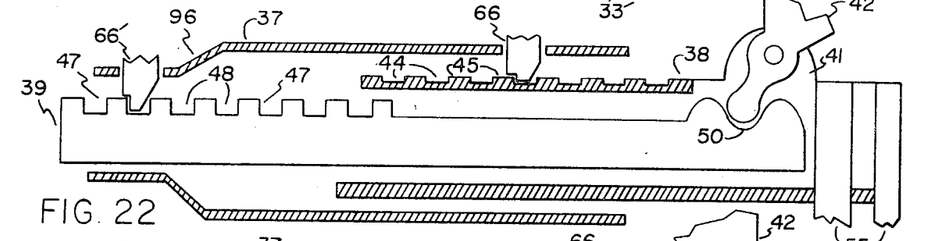
FIG. 22 is a partial cut-away side elevation view of the compound ratchet assembly along its vertical mid-line showing the relative position of the operating parts of said compound ratchet assembly at the commencement of one stroke of the operating lever when the joint jack is being used to couple two sections of pipe together.
Figure 23:
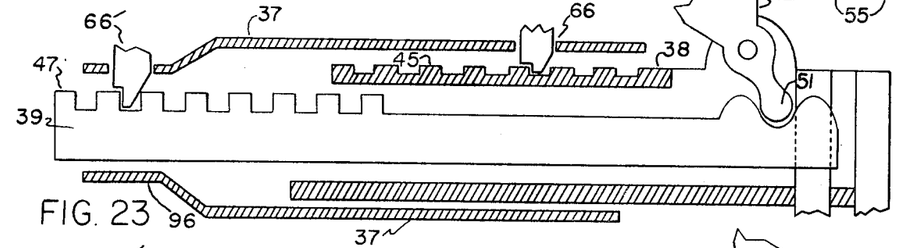
FIG. 23 is the same as FIG. 22 except that it shows the relative position of the operating parts of said compound ratchet assembly at the conclusion of one stroke of the operating lever which has produced one contraction of said double action pipe joint jack.
Figure 24:
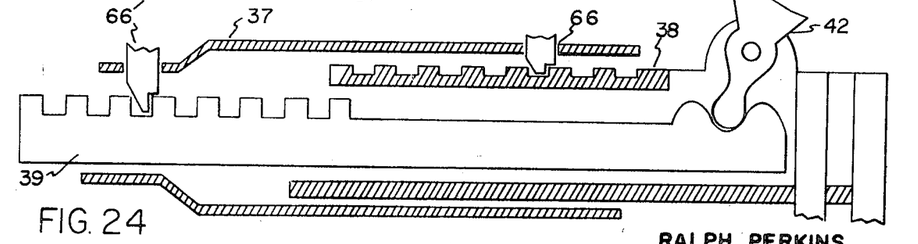
FIG. 24 is the same as FIG. 22 except that it shows the rack pawls reversed to their alternate positions to produced expansion of the double pipe joint jack with each stroke of the operating lever as said jack would be used in separating two sections of mated pipe as shown in FIG. 21.

Exterior frame tube 37 is pierced in two places on its upper side and each of said openings provided with threaded shoulders 94–94' through which are mounted ratchet pawls 66 and 66' as shown by the exterior view of said pawls in FIGS. 1 and 2 of the Drawings herein. An exploded view of the parts of one of said ratchet pawls 66 is shown in FIG. 9 in which the lower end of pawl stud 65 is provided with a shaped bearing surface 95 which is sloped on one side and notched on the other while the upper end of said pawl stud 65 is threaded to screw into cap nut 68. In application the threaded portion of pawl stud 65 is passed through spring 67 and keeper bolts 64 and screwed into cap nut 68 with spring 67 compressed between the shoulders of the shaped end 95 of said pawl and the keeper bolt 64. This entire assembly is then inserted into the pawl openings in exterior frame tube 37 and keeper bolts 64 and 64' are then screwed on to the threaded shoulders 94 and 94' of said openings so that first ratchet pawl 66 extends into the interior of exterior frame tube 37 to engage teeth 45 on intermediate ratchet tube 38 while second ratchet pawl 66' extends into said exterior frame tube 37 far enough to engage the teeth on the surface of inner ratchet bar 39 as shown in FIGS. 22 through 24 of the Drawings herein. The number 66 is used to designate the entire or overall ratchet pawl assembly. If exterior frame tube 37 is fabricated from an unmodified straight length of tubular material as shown in FIG. 1, inner ratchet bar 39 will not occupy all of the space within exterior frame tube 37 leaving an undesirable margin of play. Ratchet pawl 66' would also have to extend, without support, through some distance into the interior of frame tube 37 before engaging the teeth on ratchet bar 39 resulting in twisting of ratchet pawl 66' when placed under great strain. This can be partially corrected by providing a padded or tapered surface 96 at the end of exterior frame tube 37 as shown in FIG. 2, tube 37 to support the end of inner ratchet rod 39 as shown in FIG. 2 and 1 or the difficulty may be partially corrected by tapering the top surface of the outer end of frame tube 37 to permit ratchet pawl 66' to be positioned closer to ratchet bar 39 as shown in cross section in FIG. 22. Ratchet pawls 66 and 66' may be reversed by lifting the pawl against spring 67 and stop nut 64 and rotating the pawls by 180°. In the experimental prototype of the invention described herein, a wire ring 69 was used to provide a finger grip handle by which the position of pawls 66 and 66' could be reversed. In a finished manufactured jack a wing bolt or more suitable handle could be provided in lieu of wire ring 69 as the means of reversing pawls 66 and 66' without departing from the spirit of the invention. With the sloped faces of both ratchet pawl shaped surfaces 95 facing the lever end of the jack as shown in FIGS. 22 and 23, operation of lever 42 will produce a compressive force for joining successive units of pipe together. When the sloped faces of both ratchet pawl shaped surfaces are turned away from the lever end of said joint jack as shown in FIG. 24, operation of lever 42 will cause the jack to expand causing fixed pipe grip 35 and adjustable pipe grip assembly 36 to move away from each other resulting in separation of misjoined lengths of pipe as illustrated in FIG. 21 in the drawings.

Figure 19:
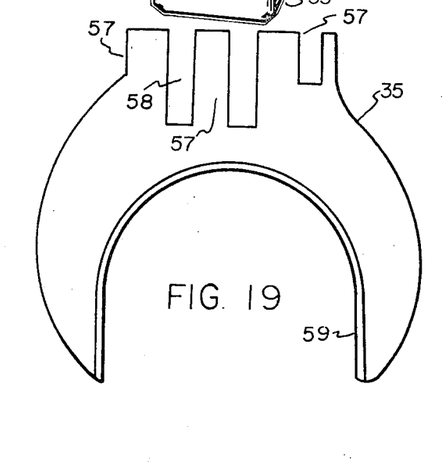
FIG. 19 is an end elevation view of the fixed pipe grip portion of the invention.
Figure 20:
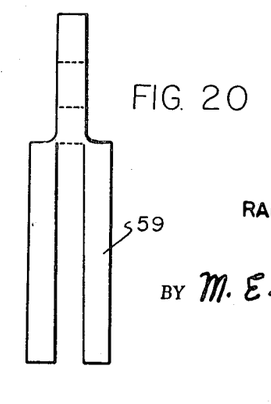
FIG. 20 is a side elevation view of said fixed pipe grip.

The joint jack invention described herein is provided with two pipe grip mechanisms which are adapted to be clamped onto and to hold two successive or abutting lengths of pipe which are to be joined together or to be separated. Fixed pipe grip 35 is fabricated in the form of a yoke shaped collar adapted to fit around and just behind the bell 33' end of a pipe joint and by pressing against said bell to exert pressure on the unit of pipe around which said pipe grip is placed. Said fixed pipe grip 35 should ordinarily be provided with a concave transverse saddle member 59 which is welded or otherwise secured just inside of the yoke opening of said pipe grip. Said transverse saddle member 59 not only increases the strength of the fixed pipe grip collar 35 but also assists in maintaining the joint jack in longitudinal alignment with the pipe being joined and reduces the danger of chipping or cracking the pipe. It will be readily apparent that a given fixed pipe grip yoke will grip pipe somewhat loosely and will be able to fit only a small range of pipe sizes. It is therefore necessary to fabricate said fixed pipe grip structure 35 as to make it an attachable removable device so that different sizes of interchangeable fixed pipe grip collars can be employed with said joint jack to adapt the jack for use with different sizes of pipe. This is accomplished, as illustrated in FIG. 19 of the drawings herein, by cutting slots or grooves 58 into the upper portion of said pipe grip structure leaving projecting tongues 57–57–57 which are adapted to slide into the space 56 between the spaced apart fixed pipe grip mounting flanges 55–55 on the forward end of intermediate ratchet tube 38. Said fixed pipe grip 35 is thereby held in a transverse position with respect to the axis of the intermediate ratchet tube 38 and the joint jack and is locked into this position by set screw locking means 62 in the face of outer mounting flange 55 but it will be appreciated that a thumb bolt or other friction or wedging device could be readily improvised to provide the locking means required to secure fixed pipe grip collar 35 in position between mounting flanges 55–55.

Adjustable pipe grip assembly 36 adapted to adjustably grip and hold the straight shank portion of a length of pipe is transversely attached or welded to an intermediate point on exterior frame tube 37. A perspective view of this adjustable pipe grip assembly 36 is provided in forward portion of FIG. 1 while sectional views of the details of the component parts are provided in FIGS. 11, 12, 13, 14, and 15. Said adjustable pipe grip assembly 36 is made up of two co-acting jaws 72 and 76 which, when closed, lock around and grip such lengths of pipe as may be placed between said co-acting jaws. Fixed jaw 72 of said adjustable pipe grip assembly 36 is fabricated from two pieces of slightly spaced apart plates of metal or tool steel which are shaped to fit part way around the top and one side of the circumference of a length of pipe.

Part of fixed jaw 72 extends downward in an arm that curves around the side portion of the pipe to be gripped. Between the two spaced apart plates that constitute the downward extending arm of fixed jaw 72 is mounted a friction leaf 73 which is suspended from pivot pin 75 such that said leaf extends a very small friction of an inch into the yoke shaped opening of fixed jaw 72. This friction leaf 73 occupies only part of the space between the slightly spaced apart plates that form fixed jaw 72 and said friction leaf hangs loosely from pivot pin 75 so that said leaf can twist toward either of the spaced apart plates. A small bar of metal or a short strip weld near the lower outer edge of the spaced apart plates forming fix jaw 72 provide a stop means 93 which prevents friction leaf 73 from being rotated completely out of the opening between co-acting jaws 72 and 76. Alternatively friction leaf 73 may be provided with a stop means structure 97 on the upper portion of friction leaf 73 which stop means portion 97 bears against the outside of frame tube 37 when pressure is applied against the edge of friction leaf 73. It should be readily apparent that when the jack is operated to push or pull a length of pipe gripped between co-acting jaws 72 and 76 that said friction leaf 73 will twist in one direction or the other and will wedge into the side of said pipe to provide a firm grip upon said pipe.

Adjustable jaw 76 including an upwardly extending lever arm portion 76' is pivotally mounted on bearing pin 77 between the horizontal portion of the spaced apart plates forming fixed jaw 72 to provide an adjustable jaw that can be opened or closed to adjustably grip a length of pipe between fixed jaw 72 and adjustable jaw 76 when adjustable jaw 76 is rotated into closed position around the pipe to be gripped. Said adjustable jaw 76 is opened or closed by force applied to the upper end of lever arm 76' in a manner here-in-after described.

Adjustable pipe grip jaw 76 is rotated about pivot point 77 to open and close said adjustable pipe grip jaws 73 and 76 by varying the position of an oblong crank lock 78 mechanism between lever arm 76' and a turnbuckle 79 linkage to a point on a fixed arm 84 extending upwardly from one side of fixed jaw 72 as illustrated in FIG. 11. Crank lock 78 is illustrated in perspective in FIG. 8 and there is a rectangular opening 87 in the upper face of said crank lock adapted to receive extention handle 54 which provides the leverage to rotate said crank lock 78 between a horizontal and vertical position. Lever arm 76' on the upper part of adjustable jaw 76 fits between spaced apart mounting ears 82–82' on crank lock 78 and is pivotally connected to said crank lock 78 by pivot pin 98 which extends from mounting ear 82 through an appropriate opening, not shown, in the upper part of said lever arm 76' to the opposite mounting ear 82'. A similar pivot pin 99 extends from an opening in the lower side panel of crank lock 78 to an identical opening, now shown, in the opposite side panel of crank lock 78 to provide pivotal connection to the threaded end of turnbuckle 79 as shown in FIG. 11. The non-threaded end of turnbuckle 79 is pivotally connected at pivot point 100 to mounting ear 101 on one side of tubular adjustment sleeve 83 which is adapted to slidably fit over upward extending arm 84. When manual force is applied to an extention handle 54 to rotate crank lock 78 into a horizontal position pivot point 99 on the end of turnbuckle 79 is moved upward and pivot point 98 is downward and in toward pivot point 100 until pivot point 99 sets above pivot point 98 which pulls lever arm 76' inward and results in opening adjustable pipe grip jaw 76. Reciprocally, adjustable pipe grip jaw 76 is closed by using extention handle 54 to rotate crank lock 78 into a vertical position which increases the distance between pivot point 100 and pivot point 98 with lever arm 76' being pushed outward which results in closing adjustable pipe grip jaw 76.

Note that extention handle 54 is an insertable removable handle that is used part of the time to manipulate pivotally mounted operating lever 42 and is also used to rotate crank lock 78 in opening and closing adjustable pipe grip jaws 72 and 76.

The depth or degree of bite of adjustable pipe grip jaw 76 into the pipe is adjusted by increasing or decreasing the length of the linkage between pivot point 98 and pivot point 100. Increasing the distance between pivot point 100 and pivot point 98 will cause adjustable pipe grip jaw to close further and bite more deeply into the pipe whereas shortening the distance between said pivot points will open adjustable pipe grip jaw 76 wider to accept larger sizes of pipe. The effective length of said linkage between pivot points 98 and 100 can be adjusted in two ways. Large or coarse adjustments can be made by adjusting turnbuckle 79 which will require releasing said turnbuckle 79 from pivot point 100. Such coarse adjustments will probably be required only when the joint jack has to be adjusted to grip an entirely different size of pipe. Small or fine adjustments may be more readily affected by adjusting the position of tubular adjustment sleeve 83 which slides on inclined arm 84 and varies the position of pivot point 100 since pivot point 100 is a part of turnbuckle mounting ear 101 on one side of said tubular adjustment sleeve 83. Said tubular adjustment sleeve 83 is impelled upward along inclined fixed arm 84 by compression spring 85 which fits over the threaded part of arm 84 and is compressed between shoulder 84' of said arm 84 and cap 83' on the upper end of said tubular adjustment sleeve 83. The exact position of adjustment sleeve 83 is adjusted by screwing knurled collar 86 on to the threaded portion of fixed inclined arm 84 until adjustable pipe grip jaw 76 is forced into sufficient closure to affect a firm grip on the pipe to be held.

OPERATION

In operating the compound pipe joint jack described in this invention two sections of pipe or tubing are brought into end-to-end alignment with each other in the bottom of the trench in which the pipe is to be laid or on an appropriate surface with the straight shank of one section of pipe facing the bell end opening of the adjacent section of pipe. A neoprene or other appropriate gasket or sealing ring is placed in the bell end of the pipe and the two sections positioned for joining. The double action pipe joint jack is the placed astride the adjoining portions of said two sections of pipe as shown in FIGS. 1 and 2 of the drawings herein with fixed pipe grip collar 35 placed behind the shoulder or flanged bell 33' of one section of the pipe while the opened jaws of adjustable pipe grip 36 are placed astride the adjacent section of pipe as shown in said FIG. 2. It is assumed that an appropriate size fixed pipe grip yoke 35 is attached to the forward end of the joint jack at the beginning of the operation. In he event that yoke shaped fixed pipe grip 35 is so large as to fit too loosely or if the yoke opening of said fixed pipe grip 35 is too small then set screw 62 should be released so that fixed pipe grip 35 can be removed and an appropriate size interchangeable fixed pipe grip yoke 35 should be inserted between the spaced apart mounting flanges 55–55 and locked into place by lock nut securing means 62.

Extension handle 54 is removed from its customary place in operating lever 42 and inserted into the recess in the top of crank lock 78 where it is used to rotate crank lock 78 into horizontal position to open the adjustable pipe grip jaws 73 and 76 as shown in FIG. 11 of the drawings herein so that said adjustable pipe grip jaws may be positioned on and around the straight shank of the second section of pipe. Crank lock 78 is then rotated by application of extension handle 54 back toward a vertical position to close adjustable jaw 76 and to determine whether or not said adjustable pipe grip assembly 36, including jaw 73 and adjustable jaw 76, will firmly grip the pipe being joined. If adjustable jaw 76 will not completely close or if said adjustable pipe grip assembly 36 fits too loosely after closing adjustable jaw 36, then knurled collar 86 and/or turnbuckle 79 should be adjusted to the extent necessary to make adjustable pipe grip jaws 73 and 76 bite securely into the shank of the pipe to be gripped. The details of making this adjustment were explained above in describing said pipe grip adjustment mechanism. The object of providing a wedging friction leaf in one half of the adjustable pipe grip assembly and providing both a coarse and a fine control mechanism for controlling the exact amount of bite applied by adjustable jaw 76 is to enable the jack to grip the shank of the straight piece of pipe firmly without slipping while not crushing or denting it. Obtaining this exact amount of gripping pressure in adjustable pipe grip assembly 36 may require some repeated and cautious experimentation. If only one size and kind of pipe or tubing is to be used, some time may be saved by experimenting on level ground rather than down in a trench and making the required adjustments before attempting to operate the jack within the narrow confines of a trench. It will be obvious that once the necessary adjustments of turnbuckle 79 and knurled collar 86 have been made for a given size of pipe that the jack with the same adjustments can be used for joining additional sections of pipe as long as all of the subsequent sections of pipe are of the same diameter.

If extension handle 54 is to be used to rotate crank lock 78 in the bottom of a narrow trench, it may well be desirable to fabricate extension handle 54 with a twist in that portion of the shank of said extension handle which is to fit into crank lock 78 so that said crank lock can be manipulated between its two alternate positions without having to extend handle 54 into a completely horizontal position. Such a twist in the shank of extension handle 54 would make it awkward to use said handle in operating lever 42 to operate the joint jack but this difficulty can be overcome by providing a straight shank section on the other end of extension handle 54 to enable it to fit into operating lever 42. Thus a single extension handle may be adapted to serve both as a jack handle in connection with operating lever 42 and as a handle for operating crank lock 78 to open and close adjustable pipe grip jaw 76. The modification of both ends of extension handle 54 to enable it to perform two alternate functions is not claimed to be inventive and no effort has been made to show the kind of twist in handle 54 that would be required to enable said handle to perform both functions within the narrow confines of a trench but any person skilled in the art of tool design can provide a suitable handle adapted to perform both functions.

If said improved compound pipe joint jack is positioned as shown in FIGS. 1 and 2 of the drawings herein and is to be used to make or join seccessive sections of pipe, then ratchet pawls 66 and 66' should be rotated so that the slopping shaped surface of pawl shoulder 95 faces the operating handle end of said joint jack and the notched portion of said pawl shoulder 95 faces the rear end of said joint jack as illustrated in FIGS. 22 and 23. Under such circumstances each stroke of operating lever 42 will cause a shortening of said compound ratchet assembly 34. Thus when extension handle 54, starting from the position shown in FIG. 22, is pulled toward ratchet pawls 66 and 66' driving the bearing pin end of operating lever 42 forward against the U shaped cam bearing surface 50 on inner ratchet bar 39, this applies a force that tends to lift the sloped face of ratchet pawl 66 out of groove 44 between teeth 45—45 of intermediate ratchet tube 38 thus forcing said intermediate ratchet tube 38 backward by one notch as compared to the position of exterior frame tube 37 and inner ratchet bar 39 whereas said ratchet bar 39 is prevented from moving with respect to exterior frame tube 37 because the notched end of ratchet pawl 66' is locked in position by the notched face of pawl 66' bearing against tooth 47 of said inner ratchet bar 39. At the conclusion of this first stroke said ratchet assembly 34 will have been contracted by the length of one notch on intermediate ratchet tube 38 and pipe grips 35 and 36 will have been pulled closer together by the distance of one notch, as shown in FIG. 23 of the Drawings carrying with said pipe grips the two attached sections of pipe that are being joined.

When a second or alternate stroke of extension handle 54, starting from the position shown in FIG. 23, forces oscillating bearing pin 51 on the lower end of operating lever 42 to press against cam surface 50 on inner ratchet bar 39, intermediate ratchet tube 38 is locked in position with respect to exterior frame tube 37 by the notched face of ratchet pawl 66 bearing against tooth 45 on said intermediate ratchet tube 38 with the results that movement is possible only by forcing inner ratchet bar backwards lifting the sloped face of ratchet pawl 66' over ratchet tooth 47 on said inner ratchet bar 39 until said pawl falls into the next groove 48 on said inner ratchet bar 39 thereby compressing or shortening the length of compound ratchet assembly by the length of another notch or tooth. This process is repeated with each alternating stroke of extension handle 54 until the two units of pipe are securely joined. Adjustable jaw 36 is then opened to release the grip of the jack on the joined pipe and the jack is moved on to the next section of pipe to be joined where the above described process is repeated.

When a joined section of pipe has become misaligned in the process of being joined or the section is too long or too short so that the sections of pipe need to be separated, the joint jack is moved and reapplied to the pipe joint with fixed pipe grip jaw 35 positioned just in front of the bell of one of the units of pipe (instead of behind the bell) as shown in FIG. 21 of the drawings and reversable ratchet pawls 66 and 66' are reversed to make the notched faces of said ratchet pawls face the operating lever end of said compound ratchet assembly as shown in FIG. 24. Under these altered circumstances each stroke of extention handle 54 and operating lever 42 will expand or drive the parts of compound ratchet assembly further apart so that fixed pipe grip 35 will push against the bell of pipe section 33 and eventually force the two sections of pipe to separate.

ADVANTAGES

A principal advantage of building a pipe joint jack employing a compound ratchet assembly is that such device enables the jack to develope great compressive power with a minimum of applied effort and in a minimum amount of space.

An advantage of this invention is that the pipe joint jack can be operated in a narrow trench by a single man by a lever that operates the jack parallel to the length of the trench so that the compressive pressure required to join segments of pipe fitted with neoprene washers can be developed without having to enlarge the trench.

Another advantage of the invention is that the development of an adjustable pipe grip jaw that can be opened or closed to grip the shank of a straight length of pipe has eliminated the need for using hooks and chains that so often damaged or misaligned the sections of pipe in the process of joining them.

Another advantage of this invention is that the pipe joint jack will adjust to various sizes of pipe by the use of a jaw that can be adjusted to the outer diameter of the straight pipe segment by manipulation of a turnbuckle for coarse adjustments and fine adjustment made by a control collar from a convenient position above the pipe being joined.

Still another advantage of this invention is that the pipe joint jack will hold the straight segment of pipe securely without the pipe slipping or crimping since the jack jaw is constructed with an inner leaf that wedges against the pipe to form a friction lock.

Still another advantage of this invention is that the pipe joint jack will disassemble misjoined pipe segments by simply reversing the pawls that engage the intermediate ratchet tube and the inner ratchet bar and then operating the lever in the same manner as used in locking the pipe segments.

Although this specification describes but a single embodiment of the Invention with certain applications thereof, it should be understood that structural or material rearrangements of adequate or equivalent parts, substitutions of equivalent functional elements and other modifications in structure can be made and other applications devised without departing from the spirit and scope of my Invention. I therefore desire that the description and drawings herein be regarded as only an illustration of my Invention and that the Invention be regarded as limited only as set forth in the following claims, or as required by the prior art.

Having thus described my Invention, I claim:

1. An improved compound pipe joint jack for joining or separating lengths of sewer pipes employing neoprene sealing rings, said improved joint jack comprising:
   A. a lever operated compound ratchet assembly having
      1. an exterior frame tube provided with openings at each end and provided with holes for mounting a pair of rack pawls through one surface of said frame tube;
      2. an intermediate ratchet tube adapted to slide inside of the opening of the exterior frame tube and having
         a. a longitudinal opening through the length of said intermediate ratchet tube,
         b. spaced apart mounting flanges at one end of said intermediate ratchet tube adapted to receive and hold a fixed pipe grip in transverse position with respect to the longitudinal axis of said intermediate ratchet tube, and
         c. means for locking the fixed pipe grip into position between said flanges,
         d. spaced apart ears on one side of said intermediate ratchet tube and being adapted for mounting a ratchet lever;
         e. a slot shaped opening between said spaced apart ears adapted to permit a ratchet lever mounted between said ears to extend into the interior of said intermediate ratchet tube,
         f. ratchet teeth cut into one surface of said intermediate ratchet tube,
      3. an inner ratchet bar adapted to fit within and slide inside of said intermediate ratchet tube, said inner ratchet bar having
         a. a generally U shaped cam surface near one end of said inner ratchet bar,
         b. a series of ratchet teeth along most of one surface of said inner ratchet bar, 4. an operating lever pivotally mounted between the spaced apart ears on the intermediate ratchet tube and having
   a. an oscillating pin at one end of said operating lever adapted to fit into and engage the cam surface on the inner ratchet bar and
   b. a recess in the opposite end of said operating lever adapted to receive an extension handle,
5. a first reversible pawl mounted in and extending through one surface of the exterior frame tube to engage the teeth in the surface of the intermediate ratchet tube,
6. a second reversible pawl mounted in and extending through one surface of the exterior frame tube to engage the teeth in the surface of the inner ratchet rod, B. a yoke shaped fixed pipe grip adapted to fit around and just behind the bell end of a pipe joint and having
   1. a concave transverse saddle member secured just inside the yoke opening of said fixed pipe grip and
   2. tongues adapted to fit into and between the mounting flanges on one end of the intermediate ratchet tube by which said fixed pipe grip may be secured and held in transverse position with respect to the axis of the intermediate ratchet tube, C. an adjustable pipe grip assembly adapted to adjustably grip and hold the straight portion of a length of pipe, said adjustable pipe grip assembly comprising
   1. a fixed jaw fabricated from two pieces of slightly spaced apart plates of metal transversely attached to an intermediate point on said exterior frame tube
      a. said fixed jaw being shaped to fit part way around the top and one side of the circumference of a length of pipe,
      b. having a friction leaf pivotally mounted between the spaced apart plates of said fixed jaw, and
   2. an adjustable jaw pivotally attached to the open end of the fixed jaw and having an upwardly extending lever arm by which said adjustable jaw can be opened or closed to adjustably grip a length of pipe between said fixed jaw and said adjustable jaw,
   3. a pipe grip adjustment mechanism including
      a. a threaded arm extending upwardly from one side of fixed jaw of the adjustable pipe grip,
      b. a tubular adjustment sleeve adapted to fit over said threaded arm,
      c. a compression spring adapted to fit over the threaded part of said threaded arm,
      d. a knurled collar adapted to screw onto the threads on said threaded arm and adjust the position of the tubular adjustment sleeve on said arm,
      e. a threaded turnbuckle pivotally connected to the ears on the lower part of tubular adjustment sleeve,
      f. a crank lock mechanism pivotally connected to the upward extending lever arm of the adjustable jaw
      g. a threaded screw with one end adjustably connected to the threaded turnbuckle and the other end pivotally connected to said crank lock so that said adjustable jaw of the adjustable pipe grip is opened when the crank lock is rotated into one position and said adjustable jaw is closed to grip a pipe when said crank lock is rotated to its alternate position.

* * * * *